Patented Mar. 6, 1945

2,370,911

UNITED STATES PATENT OFFICE 2,370,911

BITUMINOUS EMULSIONS

Evart E. Mayfield, Wilmington, Del., assignor to Hercules Powder Company, Wilmington, Del., a corporation of Delaware No Drawing. Application July 25, 1941, Serial No. 404,001

10 Claims. (Cl. 252—311.5)

This invention relates to emulsifying agents, and in particular concerns liquid or fluid soap-type emulsifying agents which are particularly adapted for use in the manufacture of aqueous bituminous or asphaltic emulsions. It also concerns aqueous emulsions prepared with the aid of such emulsifying agents.

At the present time, oil-in-water type aqueous emulsions of natural or artificial asphaltic or bituminous materials are widely used in the road surfacing, soil stabilization, impregnating, waterproofing, and allied arts. Such emulsions are usually prepared by the high speed mechanical mixing of the melted asphaltic or bituminous material with water and a fatty acid, vegetable oil, or resin soap. In spite of wide use, however, the soaps which are employed as emulsifying agents in this manner have the common disadvantage of being difficult and inconvenient to handle by reason of their lack of fluidity and their tendency to gel or exist in the semi-solid state even at relatively high water content. Furthermore, the aqueous bituminous emulsions prepared with the aid of such agents are so stable chemically, i. e., their demulsibility value is so low, that difficulty is often experienced in causing the emulsion to break at the proper time and in the proper manner.

Accordingly, it is an object of this invention to provide easily handled fluid soap-type emulsifying agents.

Another object is to provide fluid soap-type emulsifying agents whose compositions may be varied to secure corresponding variations in the breaking characteristics of aqueous bituminous emulsions prepared therewith.

A further object is to provide an inexpensive agent which will impart fluidity to the soap-type emulsifying agents which have heretofore been employed in manufacturing aqueous bituminous emulsions and which normally exist in the solid or semi-solid state.

A further object is to provide aqueous asphaltic or bituminous emulsions having pre-determined breaking characteristics.

Other and related objects will be apparent from the following detailed description of the invention, and many advantages other than those specifically referred to herein will occur to those skilled in the art upon employment of the invention in practice.

I have found that the above objects and attendant advantages may be attained through the use of an agent comprising the saponification product of the product obtained by the destructive distillation of B wood rosin. This product, herein termed "saponified B wood rosin oil," is a normally fluid or soft resinous material which may advantageously be employed alone or in combination with other soaps in preparing aqueous bituminous emulsions. The emulsions in which this product is employed as the sole emulsifying agent are characterized by unusually high demulsibility values, i. e., they break very readily and very completely upon contact with certain chemical agents, but at the same time have excellent physical stability, i. e., they do not tend to separate or break upon long standing. The bituminous emulsions in which the saponified B wood rosin oil is employed in combination with other soaps have breaking characteristics intermediate between those of the slow-breaking soap emulsions and those of the quick-breaking saponified B wood rosin oil emulsions. By varying the proportions in which the saponified B wood rosin oil and other soaps are employed it is possible to prepare bituminous emulsions having predetermined and widely varying breaking characteristics. The saponified B wood rosin oil emulsifying agent provided by the present invention has the further property of imparting fluidity to the heretofore employed solid or semi-solid fatty acid or resin soap emulsifying agents. It is notable that the fluidity of mixtures of saponified B wood rosin oil and normally solid soaps is not merely the average fluidity of the separate components, but is considerably greater, approaching that of the saponified B wood rosin oil itself even where the proportion of normally solid soap is as high as 50 per cent by weight.

The saponified B wood rosin oil emulsifying agent provided by the invention is prepared by saponifying the oil-like or soft resinous product obtained by the destructive distillation of B wood rosin, with an aqueous alkali such as sodium or potassium hydroxide. B wood rosin, also known as "Belro resin," is a hard dark-colored resinous material obtained as a by-product in the selective solvent refining of crude wood rosin. It comprises a large proportion of the color bodies and some of the gasoline-insoluble material originally present in the rosin, and is characterized by the following approximate analysis:

| | |
|---|---|
| Unsaponifiables_____percent__ | 10–20 |
| Gasoline-insolubles _____do____ | 35–75 |
| Acid No_____ | 100–130 |
| Saponification No_____ | 140–200 |
| Drop melting point_____°C__ | 85–95 |

B wood rosin oil is a complex mixture of volatile components and decomposition products obtained by the destructive distillation of B wood rosin at relatively high temperatures, e. g. 300°–400° C. The distillation operation may be carried out in any desirable manner, for example, by distilling the B wood rosin under vacuum or at atmospheric pressure. Alternatively, the distillation may be carried out in the presence of a decarboxylation catalyst such as fuller's earth, sodium acid sulfate, phosphoric acid, etc., and may be effected either by the use of superheated steam or by direct firing. If desired, an inert gas, such as carbon dioxide or nitrogen, may be passed through the still as the distillation proceeds in order to sweep out the more volatile components before complete decomposition takes place. Any of the other well-known variations in destructive distillation processes may likewise be employed.

In most cases the distillate obtained comprises an oily material, a considerable amount of water, and small amounts of low-boiling materials. The oil may vary somewhat in composition depending upon the particular distillation process employed, but in general is characterized by the following approximate analysis:

| | |
|---|---|
| Saponification No | 30–55 |
| Acid No | 25–45 |
| Boiling range °C | 165–395 |
| Specific gravity at 15.6° C | 1.02–1.035 |

Such oil is very readily saponified to form the emulsifying agents of the present invention.

When the destructive distillation is carried out under high vacuum, however, the distillate may normally take the form of a soft resinous material. This product is characterized by acid and saponification numbers considerably higher than those of the oil-like product described above, but since it is substantially equivalent thereto in practice of the present invention, it is to be understood as included within the term "B wood rosin oil" as employed herein and in the appended claims.

The saponification reaction is conveniently carried out simply by mixing the B wood rosin oil with an excess of an aqueous alkali-metal hydroxide, e. g., sodium or potassium hydroxide, and stirring the mixture at room temperature until the reaction is complete. If desired, however, the reaction may be carried out at elevated temperatures, although the use of such temperatures is not necessary since the reaction takes place very readily and the saponified product is normally fluid at room temperatures. Also, if desired, other alkalies, such as sodium carbonate, potassium carbonate, etc., may be employed.

The saponified B wood rosin oil product is normally fluid even at very high solids content. This property of fluidity constitutes a considerable advantage since it renders the product much more easily handled and more readily dissolved in water than the solid soaps. The use of such a liquid soap is of particular advantage in preparing aqueous asphaltic or bituminous emulsions, since the large quantities of materials employed render ease of handling of considerable importance.

The procedure employed in preparing such emulsions usually comprises dispersing the saponified B wood rosin oil in the water phase and thereafter adding the asphalt or bituminous material in the molten state to the water in a fine stream and with rapid stirring. The mixture is then passed through a suitable dispersing machine to form a stable emulsion. If desired, a small amount of a free alkali may be added to the water phase prior to emulsification for the purpose of improving the physical stability of the emulsion. Either natural asphalts and bitumens, such as California, Venezuelan, or Trinidad asphalts, or artificial bituminous materials, such as coal tar pitch, stearin pitch, petroleum pitches, etc., may be emulsified in this manner. Usually the saponified B wood rosin oil emulsifying agent is employed in an amount representing between about 0.5 and 5.0 per cent by weight of the asphaltic or bituminous material, although the optimum proportion will depend upon the nature of such material as well as upon the breaking characteristics desired in the aqueous emulsion.

As previously mentioned, saponified B wood rosin oil may advantageously be employed in combination with normally solid soap-type emulsifying agents for the purposes of imparting fluidity to such solid soaps and of modifying the breaking characteristics of the emulsions prepared therewith. Any of the solid soap emulsifying agents, e. g., rosin soaps, fatty acid soaps, fish oil soaps, cottonseed oil soaps, corn oil soaps, coconut oil soaps, etc., may be modified with saponified B wood rosin oil in this manner, and the proportion in which the latter is employed may be varied widely to obtain a variety of soap mixtures having any desired degree of fluidity and a wide variety of emulsifying characteristics. Such mixtures may be prepared simply by intimately mixing the saponified B wood rosin oil and the solid soap, or, more preferably, they may be prepared by saponifying a mixture of B wood rosin oil and the unsaponified fatty or resin acid or saponifiable oil.

A mixed soap emulsifying agent of this type which has been found particularly advantageous comprises the mixture of saponified B wood rosin oil and B wood rosin soap prepared by treating a mixture of approximately equal parts of B wood rosin and B wood rosin oil with an aqueous alkali such as sodium or potassium hydroxide. This product may also be prepared by mixing previously saponified B wood rosin oil and B wood rosin soap, and, if desired, the proportions of the two components may be varied over a wide range to modify the emulsifying characteristics of the mixture.

The following examples will illustrate several ways in which the principle of the invention has been applied, but are not to be construed as limiting the same.

Example I

Approximately 200 parts by weight of B wood rosin oil having a saponification number of 34 was stirred at room temperature with a solution of 5 parts by weight of sodium hydroxide in 200 parts of water until reaction was complete. Approximately 20 parts by weight (dry basis) of the resulting liquid saponified B wood rosin oil and 2 parts by weight of sodium hydroxide were dissolved in 400 parts by weight of water, and the solution was heated to a temperature of about 65°–75° C. Approximately 600 parts by weight of Venezuelan asphalt were melted by heating to a temperature of about 110° C., and the molten asphalt and aqueous solutions were emulsified by passing through a high-speed colloid mill. The emulsion so obtained had an A. S. T. M. 1/50 N. CaCl$_2$ demulsibility value of about 88%. A similar emulsion in which only 5 parts by weight of the saponified B wood rosin oil had been employed as the emulsifying agent had a demulsibility value of 100%.

Example II

Approximately 9.0 parts by weight of saponified B wood rosin oil prepared as described in Example I above and 1.2 parts of sodium hydroxide were dissolved in 400 parts by weight of water. This solution and approximately 600 parts of molten California asphalt were then emulsified by passing through a colloid mill. After being allowed to stand for one year, during which time it did not settle or separate, the emulsion had an A. S. T. M 1/50 N. CaCl₂ demulsibility value of about 63%.

Example III

A mixture of 1000 parts by weight of B wood rosin and 1000 parts by weight of B wood rosin oil was heated until the rosin completely dissolved in the oil, after which 560 parts by weight of a 25 per cent by weight aqueous solution of sodium hydroxide were added with stirring. The resulting product contained about 81 per cent by weight of solids but was sufficiently fluid to flow readily through a ¾ inch pipe. In contrast, saponified B wood rosin is normally a solid, even at relatively low solids content. Following the procedure described in Example I, the following emulsions were prepared employing varying amounts of this product as the emulsifying agents:

| | | | | |
|---|---|---|---|---|
| Venezuelan asphalt__parts__ | 600 | 600 | 600 | 600 |
| Water _____do____ | 400 | 400 | 400 | 400 |
| Emulsifying agent___do____ | 22 | 18 | 13 | 7 |
| Sodium hydroxide___do____ | 1 | 1 | 1 | 1 |
| A. S. T. M. 1/50 N. CaCl₂ demulsibility value—percent__ | 25 | 37 | 38 | 53 |

Similar results may be obtained employing other soaps in combination with the saponified B wood rosin oil.

It will be noted from the above examples that the chemical stability of aqueous asphalt emulsions prepared with the aid of saponified B wood rosin oil may be varied between wide limits, and that such emulsions may be prepared having exceptionally high demulsibility values. At the same time, however, the emulsions have good physical stability and do not separate or settle upon storage. Furthermore, they have good resistance to freezing. It will also be noted that the mixture of saponified B wood rosin oil and saponified B wood rosin was fluid at exceptionally high solids content. By varying the proportions of saponified B wood rosin in such mixtures, a variety of compositions having a wide range of pre-determined emulsifying characteristics may be provided in a simple and economical manner.

Other modes of applying the principle of my invention may be employed instead of those explained, change being made as regards the ingredients or methods employed, provided the product stated by any of the following claims, or the equivalent of such stated product, be obtained.

What I claim and desire to protect by Letters Patent is:

1. An emulsifying agent for bituminous emulsions comprising a mixture of alkali metal saponified B wood rosin oil and another alkali metal soap emulsifying agent, said saponified B wood rosin oil being present in an amount of at least 0.5% by weight of the bitumen in said emulsion.

2. An emulsifying agent for asphalt emulsions comprising a mixture of alkali metal saponified B wood rosin oil and alkali metal saponified B wood rosin said saponified rosin oil being present in an amount of at least 0.5% by weight of the asphalt in said emulsion.

3. An emulsifying agent for asphalt emulsions comprising a mixture of substantially equal parts by weight of alkali metal saponified B wood rosin oil and alkali metal saponified B wood rosin.

4. An emulsifying agent for asphalt emulsions comprising a mixture of the sodium hydroxide saponification products of B wood rosin oil and B wood rosin said saponified rosin oil being present in an amount of at least 0.5% by weight of the asphalt in said emulsion.

5. An aqueous bituminous emulsion comprising a bituminous material as the dispersed phase, water as the continuous phase, and an emulsifying agent comprising alkali metal saponified B wood rosin oil.

6. An aqueous asphalt emulsion comprising asphalt as the dispersed phase, water as the continuous phase, and an emulsifying agent comprising a fluid mixture of alkali metal saponified B wood rosin oil and another alkali metal soap emulsifying agent, said saponified B wood rosin oil being present in an amount of at least 0.5% by weight of the asphalt in said emulsion.

7. An aqueous asphalt emulsion comprising asphalt as the dispersed phase, water as the continuous phase, and an emulsifying agent comprising a mixture of alkali metal saponified B wood rosin oil and alkali metal saponified B wood rosin said saponified rosin oil being present in an amount of at least 0.5% by weight of the asphalt in said emulsion.

8. An aqueous asphalt emulsion comprising asphalt as the dispersed phase, water as the continuous phase, and an emulsifying agent comprising approximately equal parts by weight of alkali metal saponified B wood rosin oil and alkali metal saponified B wood rosin.

9. An aqueous asphalt emulsion comprising asphalt as the dispersed phase, water as the continuous phase, and an emulsifying agent comprising the sodium hydroxide saponification product of B wood rosin oil.

10. An aqueous asphalt emulsion comprising asphalt as the dispersed phase, water as the continuous phase, and an emulsifying agent comprising a mixture of the sodium hydroxide saponification products of B wood rosin oil and B wood rosin said saponified rosin oil being present in an amount at least 0.5% by weight of the asphalt in said emulsion.

EVART E. MAYFIELD.